United States Patent [19]

Sarpola et al.

[11] Patent Number: 5,933,786
[45] Date of Patent: Aug. 3, 1999

[54] SUBSCRIBER NETWORK ELEMENT

[75] Inventors: Jussi Sarpola, Oulu; Timo Kononen, Tyrnävä; Pekka Rusi; Olli Liinamaa, both of Oulu, all of Finland

[73] Assignee: Nokia Telecommunictions OY, Espoo, Finland

[21] Appl. No.: 08/849,423

[22] PCT Filed: Nov. 13, 1995

[86] PCT No.: PCT/FI95/00619

§ 371 Date: Aug. 12, 1997

§ 102(e) Date: Aug. 12, 1997

[87] PCT Pub. No.: WO96/15638

PCT Pub. Date: May 23, 1996

[30] Foreign Application Priority Data

Nov. 14, 1994 [FI] Finland ................................. 945365

[51] Int. Cl.⁶ .................................................. H04B 1/00
[52] U.S. Cl. .......................................... 455/560; 455/561
[58] Field of Search .................................. 455/74.1, 401, 455/555, 560, 561, 564; 379/280, 288, 355, 359

[56] References Cited

U.S. PATENT DOCUMENTS

| | | | |
|---|---|---|---|
| 3,705,269 | 12/1972 | Audesirk et al. | 379/158 |
| 4,658,096 | 4/1987 | West, Jr. | 455/422 |
| 5,535,260 | 7/1996 | Zicker et al. | 455/564 |
| 5,666,398 | 9/1997 | Schiffel et al. | 455/403 |
| 5,724,656 | 3/1998 | Vo et al. | 455/556 |
| 5,799,254 | 8/1998 | Karmi et al. | 455/401 |
| 5,812,651 | 9/1998 | Kaplan | 455/355 |

FOREIGN PATENT DOCUMENTS

| | | |
|---|---|---|
| 93/11625 | 6/1993 | WIPO . |
| 95/24103 | 9/1995 | WIPO . |

*Primary Examiner*—Reinhard J. Eisenzopf
*Assistant Examiner*—Makoto Aoki
*Attorney, Agent, or Firm*—IP Group of Pillsbury Madison & Sutro LLP

[57] ABSTRACT

A subscriber network element of a radio system provides a wireless local loop for transmitting telecommunication signals between subscriber stations and an exchange. To enable a register recall, the subscriber network element comprises a timer, a buffer arranged to buffer dialing frames, the timer being arranged to start measuring a new time interval upon reception of each dialing frame, and a control unit arranged to transmit a stand-by message and a register recall message, and to initialize the timer to measure a time interval of a predetermined length in response to the register recall frame, and to forward a "dialing received" frame and any digits buffered in the buffer as the time interval measured by the timer elapses.

4 Claims, 2 Drawing Sheets

SUBSCRIBER NETWORK ELEMENT

FIELD OF THE INVENTION

The invention relates to a subscriber network element of a radio system that provides a wireless local loop. The subscriber network communicates with an exchange and comprises a means to establish, via base stations, a radio connection with subscriber stations located in the coverage area of the radio system, to transmit telecommunication signals between the subscriber stations and the exchange.

BACKGROUND OF THE INVENTION

The invention relates to a Wireless Local Loop System (WLL), i.e., a radio system providing a wireless local loop, in which subscriber stations are connected over a radio connection via base stations and a subscriber network element to an exchange of a public switched telephone network. Any conventional user interface, i.e., telephone set, can be connected to a WLL system via a special terminal equipment, whereby the radio path is invisible to the user.

The subscribers of a WLL system must have access to a register recall facility and subscriber facilities requiring it, in the same way as the subscribers of a normal wired network. To render the radio path invisible to the user of a WLL subscriber station, it must be possible to use the station in exactly the same way as a conventional wired telephone. This means that a register recall must be implemented such that the subscriber first presses the R-key, waits until a dial tone is transmitted to him, and then dials the desired digits via the user interface.

WLL systems are usually based on a known cellular radio system, such as the NMT-450i system (Nordic Mobile Telephone), whereby their signal is usually similar to that of the cellular radio system concerned. It is thus advantageous that subscriber stations of the cellular radio system on which the WLL system is based can also be used in the WLL system. For example, according to the specifications of the NMT-450i system, a register recall is performed by first dial the desired digits to the memory of the telephone and then pressing the R-key to effect a register recall. When an NMT phone is used, the register recall procedures are performed in the reverse order as compared with a fixed, wired network, which is problematic to the subscriber network element of the system.

SUMMARY OF THE INVENTION

The object of the present invention is to solve the above problem and to provide a subscriber network element that is able to process a register recall regardless of the type of subscriber station that sends the register recall. This object is achieved with a subscriber network element of the present invention, which includes a timer which measures a time interval of a predetermined length, a buffer that buffers received dial frames until the time interval measured by the timer means elapses, and a control unit arranged to transmit a stand-by message to a subscriber station and a register recall message to an exchange, to initialize the timer to measure the first time interval of the predetermined length in response to receipt of a register recall frame, and to transmit a 'dial received' frame to the subscriber station and any digits buffered to the buffer to the exchange in response to the end of the time interval measured by the timer. The timer starts measuring a new time interval to a predetermine length upon receipt of each dialing frame.

The register recall and the associated facilities can be implemented in a simple and quick manner regardless of the type of subscriber station, when the recall frame and associated dialings are transmitted by the subscriber network element to the exchange of a fixed telephone network, whereby the dial by the subscriber can be analyzed in the exchange. The subscriber network element does not need to be able to analyze the dialing. The characteristics already existing in the exchange of the fixed network are not needed in the subscriber network element.

When time supervision is arranged in the subscriber network element after receipt of a register recall frame, when dialing frames received during time supervision are buffered and time supervision is re-started with each buffered dialing frame, and when a 'dialing received' frame is transmitted to a subscriber station immediately as the time supervision elapses, whether or not any dialing has been received from the subscriber station, the subscriber network element of the invention is able to process the register recall regardless of the type of the subscriber station and without having to know the type of the subscriber station beforehand. Thus, one advantage of the subscriber network element of the invention is that it provides a register recall facility for the subscribers regardless of the type of the subscriber station and without setting any new requirements for the characteristics of the subscriber network element or making it significantly more expensive.

BRIEF DESCRIPTION OF THE DRAWINGS

The invention will be described in more detail with reference to the attached drawings, in which.

DETAILED DESCRIPTION OF THE CURRENTLY PREFERRED EMBODIMENT OF THE INVENTION

Figure 1:
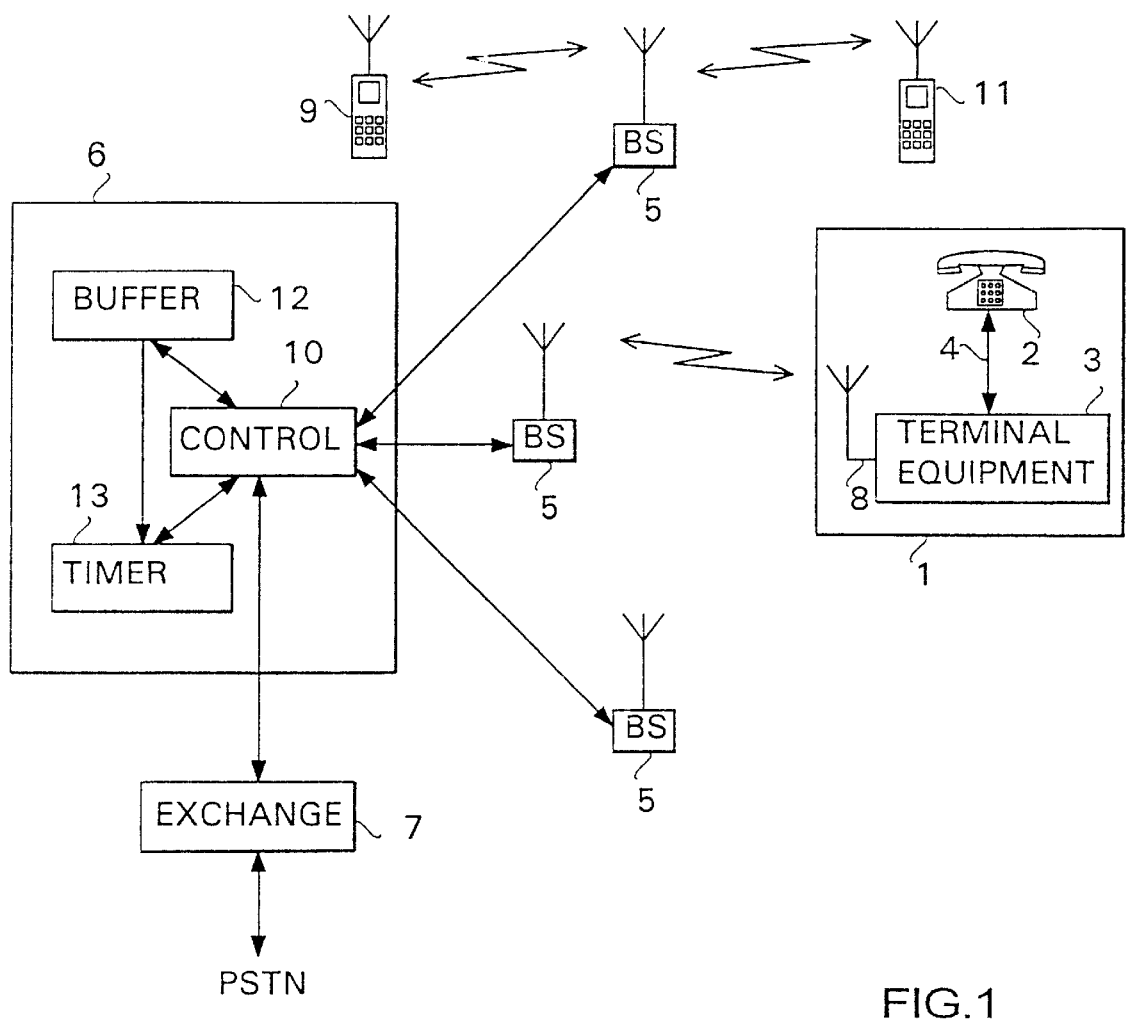
FIG. 1 is a block diagram of a first embodiment of a subscriber network element according to the invention.

FIG. 1 is a block-diagram of part of a WLL system in which the method of the invention can be applied. The WLL system shown in FIG. 1 is based on the NMT-450i system, which has been simplified by removing characteristics that are irrelevant to the WLL system. Base stations 5 correspond to base stations of the NMT-450i (Nordic Mobile Telephone) cellular radio system. With respect to signaling, a WLL subscriber station 1 functions in almost the same way as a normal mobile phone of the NMT-450i system. Calls from conventional mobile phones 9 and 11 of the NMT-450i system can also be forwarded via the base stations and a subscriber network element 6, provided that the network operator has programmed the subscriber network element 6 to forward calls from such phones. The NMT phones 9 and 11, however, can be used only in the coverage area of one base station 5, since the subscriber network element 6 of FIG. 1 does not include a handover means by which calls could be transmitted between base stations 5.

The subscriber network element 6 of FIG. 1 is connected to a local exchange 7 of the telephone network with a CCITT Q.512 V2 type open multiplexer connection using the 2 Mbit/s PCM system. The subscriber network element 6 includes a means to provide a register recall facility for subscribers by forwarding a register recall from the subscriber network element to a local exchange of the PSTN network, where this facility is already available. When the control unit 10 of the subscriber network element 6 detects a register recall frame according to the NMT specifications, the control unit 10 immediately acknowledges receipt of the recall frame by sending a stand-by message to the subscriber station over the radio path, by sending a register recall message to an exchange 7, and by initializing a timer 13 to measure a predetermined time interval, which may be e.g. 500 ms. The subscriber network element subsequently switches to a waiting mode until the end of the time interval measured by the timer 13.

The exchange 7 to which the subscriber network element 6 has transmitted the register recall message switches a dial tone to the line, and the subscriber network element forwards it to the subscriber station.

If the subscriber network element 6 receives dialing frames in the waiting mode, i.e. dialing pertaining to the register recall frame, the control unit 10 supplies the dialing contained in the frames concerned to a buffer 12. With each buffering, the timer is initialized to start measuring the same time interval of e.g., 500 ms from the beginning.

When the time supervision is finally released, i.e., the time interval measured by the timer 13 elapses, the control unit 10 sends a 'dialings received' message to the subscriber station over the radio path. Thereafter, any dialings potentially assembled in the buffer 12 are send to the exchange 7, preferably as voice frequency dialing. The register recall has thus been transmitted to the exchange 7 in full, whereby the subscriber network element continues to transmit telecommunication signals between the exchange and the subscriber station. If the buffer 12 is empty, it means that not a single digit has so far been transmitted to the local exchange 7 after the transmission of the recall message, and so the exchange 7 continues to supply a dialing tone to the line. The dialing tone is hereby transmitted as far as the subscriber, since the subscriber station has switched back to the speech mode after reception of the 'dialing received' message.

The subscriber station 1 shown in FIG. 1 comprises a conventional phone 2 that utilizes voice frequency dialing and can be connected to a conventional fixed telephone network, and a terminal equipment 3 to which the phone 2 is connected via a two-wire line 4. The terminal equipment 3 comprises signal processor, such as a radio unit, which comprises an antenna 8, a radio receiver, a radio transmitter, and a teleadapter for adapting the speech path to a radio channel. The subscriber station 1 communicates via the antenna 8 with base station 5 (the figure shows three base stations BS), through which the calls are forwarded to the subscriber network element 6 and further to the exchange 7 of the Public Switched Telephone Network PSTN, i.e., a fixed network.

From the user's point of view, a register recall is performed with a subscriber station 1 as if there were no radio path. In other words, when a register recall is performed with a subscriber station 1, the user presses the R-key in the speech mode, waits for a dial tone and subsequently dials the digits. When the user of the telephone 2 presses the R-key in the speech mode (or dials 1 if the phone is a loop dialing telephone), the terminal equipment 3 transmits a register recall frame and switches to the R-mode to wait for acknowledgement by time supervision. In the R-mode, the terminal equipment 3 does not forward the received signals to the telephone 2. The terminal equipment 3 stays in the R-mode after receiving the stand-by message from the subscriber network element 6. Not until after the terminal equipment has detected the 'dialing received' message transmitted by the subscriber network element 6 after the release of the 500 ms time supervision does the terminal equipment 3 switch back to the speech mode, in which it starts the transmission of telecommunication signals between the subscriber network element 6 and the telephone 2. Since the subscriber network element 6 at the same time forwards the dial tone supplied by the exchange 7, the tone is forwarded to the user of the subscriber station 1, and the digits dialed by the user via the telephone are then forwarded straight to the exchange 7 over the speech path.

The mobile phone 9 shown in FIG. 1 is an NMT-450i phone, and with it a register recall is performed such that the user first dials the desired digits to the memory of the phone, and then presses the R-key to activate the register recall facility. The mobile phone 9 then switches to the R-mode, sends a register recall frame, waits for a stand-by message, and after receiving said stand-by message, transmits from its memory the digits dialed by the user, utilizing the number frames defined in the NMT specifications. When the digits have been transmitted, the telephone waits for a 'dialing received' message from the subscriber network element 6, after which it switches to a speech mode.

Since the mobile phone 9 sends the digits dialed by the user from its memory immediately after receiving the stand-by message, the 500 ms time interval measured by the timer of the subscriber network element does not end before reception of the first number frame. The control unit 10 thus buffers the received number frame to the buffer 12, and initializes the timer to measure a new 500 ms time interval with each instance of buffering. Not until after the telephone 9 has transmitted the last dialing frame is the time supervision of the timer 13 released, whereby a 'dialing received' message is sent to the mobile phone 9, and the buffered digits are forwarded to the exchange 7, preferably as voice frequency dialing. After receiving the 'dialing received' frame, the mobile phone switches to a speech mode, whereby a connection is established between the phone 9 and the exchange 7.

With the mobile phone 11 of the NMT-450i system shown in FIG. 1, a register recall is performed in the same way as with a subscriber station 1. In other words, the user first presses the R-key in the speech mode, whereby the phone sends a register recall frame and switches to the R-mode to wait for a stand-by message and a 'dialing-received' message (after the 500 ms time supervision has been released in the subscriber network element). The mobile phone 11 then switches back to the speech mode, whereby the user may dial the desired digits via the phone after hearing the dial tone supplied by the exchange. The digits are forwarded as voice frequency dialing from the mobile phone 11 directly to the exchange 7.

Figure 2:
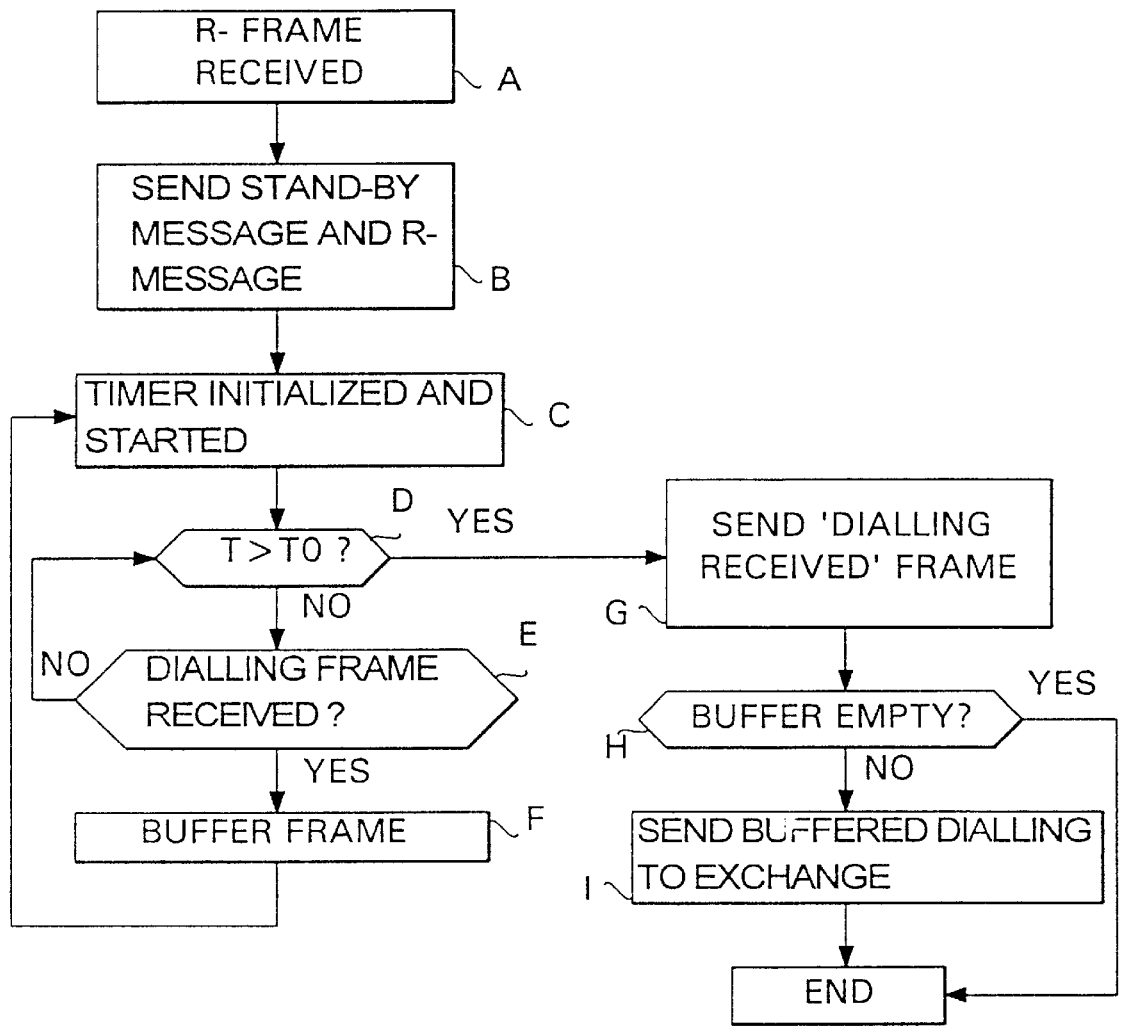
FIG. 2 is a flow diagram illustrating the operation of the network element of FIG. 1.

FIG. 2 is a flow diagram illustrating the operation of the subscriber network element according to FIG. 1. In block A, the control unit of the subscriber network element detects an R-frame, i.e., a register recall frame. In block B, the control unit sends a stand-by message to a subscriber station and an R-message, i.e., register recall, to the exchange. In block C, the timer of the subscriber network element is initialized to measure a predetermined time interval. In block D, the control unit checks whether time supervision has already been released, i.e., whether the time measured by the timer has exceeded the predetermined limit $t_0$, which may be 500 ms. In block E, the control unit checks whether the subscriber station has transmitted dialing frames. In block F, the control unit buffers the received dialing frame, whereafter the timer is initialized (in block C) to measure a new time interval.

When the control unit detects (in block D) that time supervision has ended, it sends the subscriber station a 'dialing received' frame (block G). In block H, the control unit checks the contents of the buffer. If there are digits in the buffer, the control unit forwards these to the exchange in block I as voice frequency dialing. The register recall has hereby been forwarded to the exchange in full, and the subscriber network element then continues to transmit telecommunication signals between the subscriber station and the exchange.

It is to be understood that the above description and the accompanying figures are only intended to illustrate one preferred embodiment of a subscriber network element according to the invention without limiting the invention thereto. The solution of the invention can thus also be utilized in WLL systems that are not based on the NMT-450i system. The preferred embodiments of the subscriber network element according to the invention can thus vary within the scope of the attached claims.

We claim:

1. A subscriber network element of a radio system providing a wireless local loop, the subscriber network element communicating with an exchange and comprising means for establishing, via base stations, a radio connection with subscriber stations located in the coverage area of the radio system to transmit telecommunication signals between the subscriber stations and an exchange, the subscriber network element comprising:

a timer which measures a time interval of a predetermined length;

a buffer which buffers received dialing frames until the time interval measured by the timer elapses, the timer being arranged to start measuring a new time interval of a predetermined length upon reception of each dialing frame; and a control unit which transmits a stand-by message to a subscriber station and a register recall message to an exchange, initializes the timer to measure the first time interval of the predetermined length in response to receipt of a register recall frame, and transmits a 'dialing received' frame to the subscriber station and any digits buffered in the buffer to the exchange in response to the end of the time interval measured by the timer.

2. The subscriber network element according to claim 1, wherein the subscriber network element receives register recall frames and dialing frames defined in the NMT-450i specifications.

3. The subscriber network element according to claim 1, the subscriber network element further comprising means for forwarding dialings buffered in the buffer as voice frequency dialings to the exchange.

4. The subscriber network element according to claim 1, wherein the timer measures time intervals of about 500 ms in length.

* * * * *